United States Patent [19]

Kowalski

[11] 4,279,368
[45] Jul. 21, 1981

[54] STANCHION ASSEMBLY

[75] Inventor: Daniel J. Kowalski, Ortonville, Mich.

[73] Assignee: Four Star Corporation, Troy, Mich.

[21] Appl. No.: 180,228

[22] Filed: Aug. 22, 1980

Related U.S. Application Data

[63] Continuation of Ser. No. 19,273, Mar. 9, 1979, abandoned.

[51] Int. Cl.³ .............................................. B60R 9/04
[52] U.S. Cl. .................................... 224/326; 224/309; 410/77
[58] Field of Search ............... 224/326, 309, 316, 325; 52/718; 280/179 R, 178 B

[56] References Cited

U.S. PATENT DOCUMENTS

| | | | |
|---|---|---|---|
| 3,253,755 | 5/1966 | Bott | 224/326 X |
| 3,325,067 | 6/1967 | Helm | 224/325 X |
| 3,841,660 | 10/1974 | Clark | 280/179 R |
| 4,170,322 | 10/1979 | Bott | 224/326 |
| 4,170,323 | 10/1979 | Helm | 224/309 |
| 4,174,794 | 11/1979 | Bott | 224/325 X |
| 4,241,860 | 12/1980 | Ingram | 224/316 |

Primary Examiner—Steven M. Pollard
Attorney, Agent, or Firm—Reising, Ethington, Barnard, Perry & Brooks

[57] ABSTRACT

A stanchion assembly for an automobile luggage rack is defined by a stanchion and a locking pad providing for hidden features. The stanchion is mounted to a surface of the automobile by the fasteners which are secured thereto through apertures provided in the stanchion.

4 Claims, 6 Drawing Figures

U.S. Patent   Jul. 21, 1981   Sheet 2 of 2   4,279,368
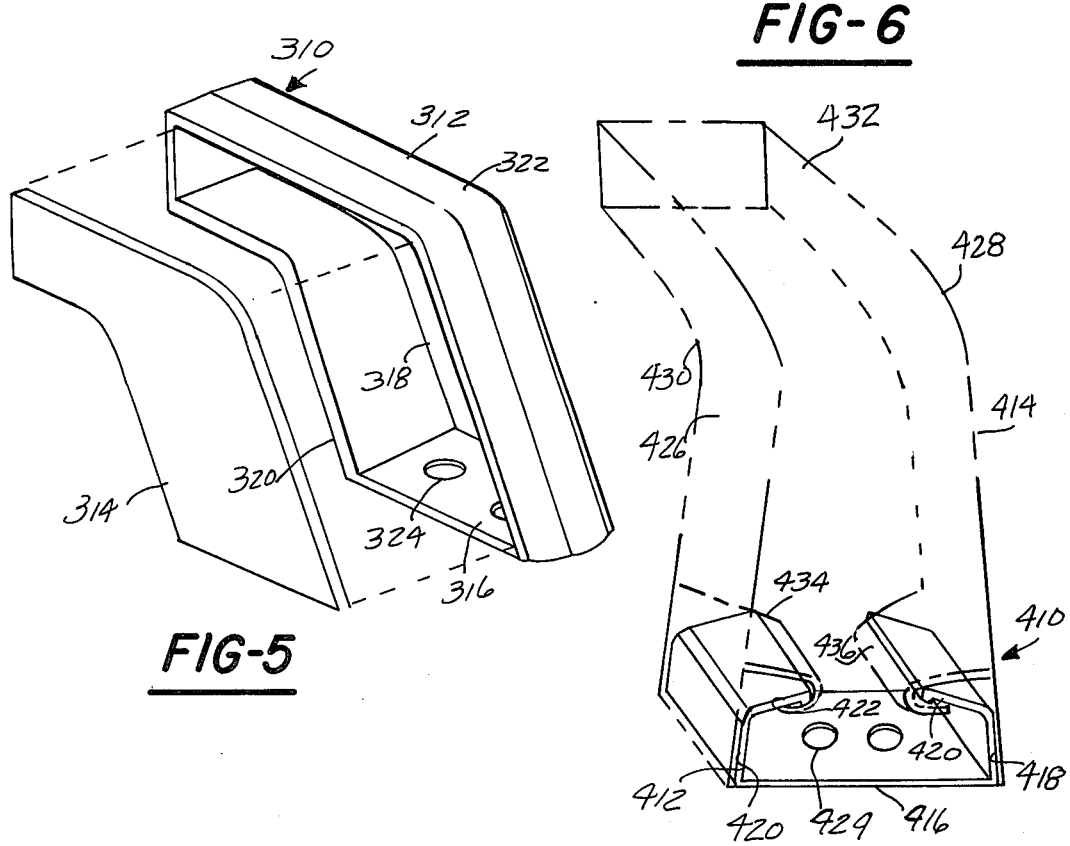
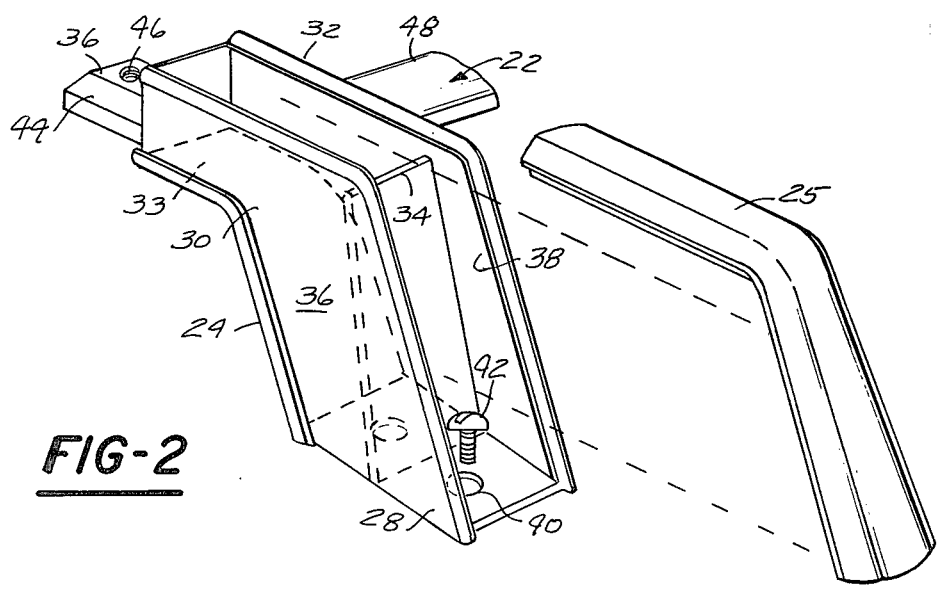

STANCHION ASSEMBLY

This is a continuation of application Ser. No. 019,273, filed Mar. 9, 1979, now abandoned.

BACKGROUND OF THE INVENTION

I. Field of the Invention

The present invention pertains to luggage racks for automobiles. More particularly, the present invention pertains to stanchion assemblies for automobile luggage racks. Even more particularly, the present invention pertains to stanchion assemblies for automobile luggage racks wherein the mounting fasteners are hidden from view.

II. Background of the Invention

It is well known to those skilled in the art that luggage racks, generally, comprise an array of rails which are supported on stanchions or stanchion members. The stanchions are mounted to the vehicle by means of fasteners such as screws. The stanchion members of the prior art generally include flanged portions having apertures provided therein for receiving the fasteners. However, fasteners mounted in this manner are exposed to the elements and can become corroded and worn thereby.

Another difficulty common to stanchion assemblies known in the art is galvanic welding which often occurs between the abutting surfaces of the stanchion and the vehicle, due to the corrosion caused by the effect of the elements.

Finally, stanchions known to the prior art are, generally, unornamented metal structures having no means by which ornamental motifs may be applied thereto.

Therefore, substantial advantages may be achieved by providing a stanchion wherein the fastening means for securing the stanchion to the automobile are completely enclosed within the stanchion.

III. Prior Art Statement

To the best of applicant's knowledge, the following is believed to be the prior art most closely related to the present invention:

U.S. Pat. Nos. De.
193,840
196,573
215,278

U.S. Pat. Nos.
3,223,301
3,325,067
3,724,730
3,853,254

SUMMARY OF THE INVENTION

The present invention, which will be described subsequently in greater detail, comprises a stanchion assembly for supporting a luggage rack or other article carrier on a vehicle, such as an automobile or the like.

The stanchion assembly hereof comprises a main section, a cap and means for mounting an article carrier rail thereto. The main section is provided with suitable openings or apertures through which are inserted fasteners to fix the stanchion to a surface of the vehicle.

The cap is secured to the main section by any suitable means. When the cap is affixed to the main section, the fasteners are completely enclosed within the stanchion.

The article carrier mounting means enables attachment of a cross-rail, side rail or the like to the stanchion.

It is therefore a primary object of the present invention to provide a stanchion assembly for a luggage rack in which the fasteners are completely enclosed within the stanchion unit.

Other objects, advantages and applications of the present invention will become apparent to those skilled in the art when the accompanying description of the present invention is read in conjunction with the accompanying drawing.

BRIEF DESCRIPTION OF THE DRAWING

The description herein makes reference to the accompanying drawings wherein like reference numerals refer to like parts throughout the several views in which:

FIG. 2 is a perspective, exploded view of the stanchion of FIG. 1;

FIG. 5 is an exploded, perspective view of a still further embodiment of the present invention, and FIG. 6 is an exploded, perspective view of another stanchion in accordance herewith.

DESCRIPTION OF THE PREFERRED EMBODIMENT

Figure 1:
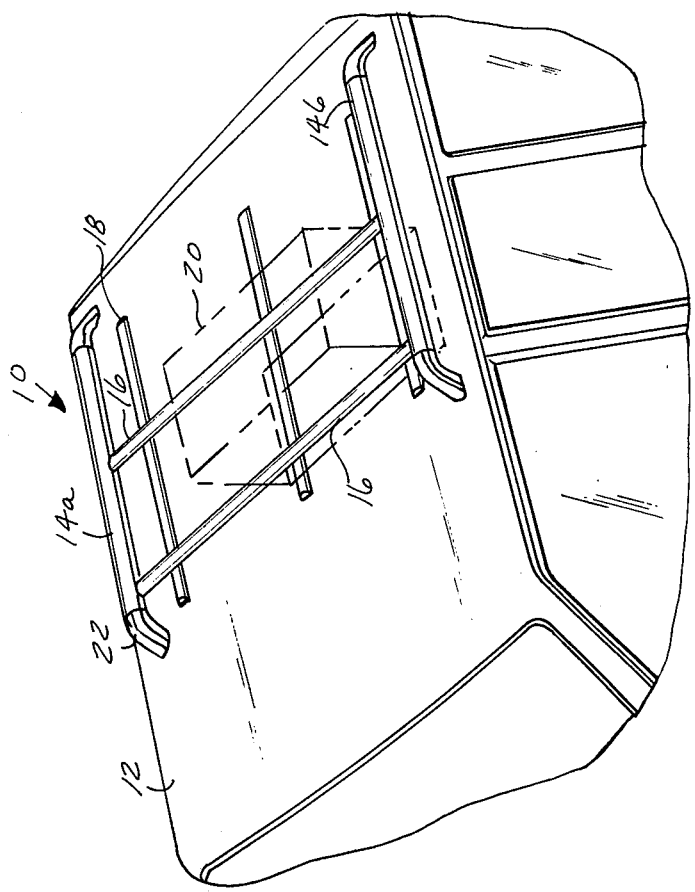
FIG. 1 is a perspective view of a luggage rack incorporating a first embodiment of the stanchion assembly hereof, and mounted onto the roof of an automobile.

Now and with reference to the drawing and, in particular FIGS. 1 and 2, there is depicted a luggage rack indicated generally at 10, secured to a surface 12 of an automobile. The luggage rack 10 comprises a pair of spaced apart side rails, 14a, 14b and at each one a cross-rail 16 (two of which are shown). A plurality of slats 18, are provided and secured along the surface of the automobile to provide support for cargo, as shown in phantom at 20. Each end of each side rail is mounted to the vehicle and supported thereon by a stanchion assembly 22. As shown in the drawing, a stanchion assembly 22 is provided at each corner of the luggage rack 10 as shown.

Each stanchion or stanchion assembly 22 comprises a main section or support body 24, a cap 25 and means for mounting a rail to the stanchion denoted at 26.

The support body 24 has a substantially, inverted L-shaped configuration and includes a base 28, a pair of spaced apart, parallel, upstanding side walls 30, 32 and an end wall 33. A vertical gusset 34 extends upwardly from the base 28 between the walls 30, 32. The gusset 34 abuts against and supports the walls 30, 32. As shown in the drawing, each side wall 30, 32 is provided with a recessed area 36, 38. The recess defines a seating area for an aesthetic tape, anodizing strip or the like (not shown). The formation of the recess, however, is not critical hereto.

The base 28 is provided with at least one aperture 40, a plurality of which are depicted. A fastener, such as a screw 42 or the like, is insertable through the apertures 40 to secure the stanchion to the vehicle surface. It is to be appreciated that when the cap 25 is positioned, the screw 42 is hidden from view as well as being shielded from the environment thereby preventing the rusting thereof.

The cap 25 is employed to enclose the hollow interior of the support section 24. The cap 25 frictionally fits between the side walls 30, 32 to seal off the interior. The cap 25 is formed from any suitable material, such as rubber, plastic, metal or the like. The cap, as noted, is press fitted between the walls 30, 32.

As clearly shown in FIG. 2 projecting outwardly from the end wall 33 is the rail mounting means 26. The rail mounting means 26 is employed to mount a rail, such as a side rail, onto the stanchion. The mounting means 26 comprises a projection 44 which telescopically receives an end of a rail 14a. An aperture 46 is formed through the projection 44 and receives a fastening means, such as a setscrew or the like (not shown) which extends through both the rail as well as the mounting means 26 to securely mount the end of the rail to the mounting means 26.

It is also contemplated in the practice of the present invention that the interiorly disposed side wall 32 have mounted thereonto a cross rail receiving means 48. The cross rail receiving means 48, where used, mounts a fixed cross rail between the stanchions transversely of the vehicle. The cross rail receiving means can comprise any suitable projection, capable of mounting a rail thereonto.

Figure 3:
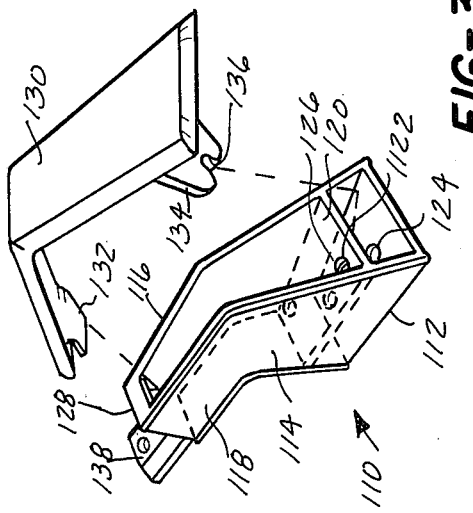
FIG. 3 is an exploded, perspective view, partially in phantom, of an alternate embodiment hereof.

Referring now to FIG. 3 there is depicted therein an alternate embodiment of the present stanchion and indicated at 110. The stanchion hereof comprises a bottom wall 112, a pair of spaced apart, upstanding, substantially parallel side walls 114, 116 and an end wall 118. The base, side walls and end wall are integrally formed to provide a substantially open topped member having a hollow interior. A gusset 120 is disposed within the interior of the stanchion substantially parallel to the base 112. The gusset defines a support for the end wall as well as the side walls 114, 116. The gusset is fixedly connected to the end wall and the side walls by any suitable mode such as die casting, welding or the like. At least one aperture 122 is formed in the gusset 120. At least one aperture 124 is formed in the base 112. The apertures 122 and 124 are in registry and receive therethrough a fastener such as a screw 126. The screw 126 projects through the apertures and secures the stanchion to the surface of the vehicle.

In accordance with this embodiment a flange 128 is formed at the uppermost portion of the end wall 118 and extends between the side walls 114, 116. The flange functions substantially as a gusset. The flange also defines a lip to which is mounted an enclosing cap 130.

The cap 130 is configured to enclose the stanchion and is, thus, complementary configured to the opening defined by the cooperation between the side walls, the gusset and the end wall. An interior finger 132 depends from the cap 130, as shown. The finger 132 fits beneath or interiorly of the flange 128. Hence, the flange 128 fits into the space defined between the finger 132 and the cap 130.

The opposite end of the cap 130 includes fastener engaging ledge 134. The ledge 134 is integrally formed with the cap 130 and projects outwardly therefrom. The ledge 134 has a recess 136 formed therewithin which is configured to encircle the fastener 126. Hence, when the cap is press fitted into engagement with the main section or support section of the stanchion the cap is first fitted about the flange 128 and is then rotated about the flange such that the ledge 134 projects beneath the gusset and the recess 136 encircles the fastener. In this manner the cap 130 is held firmly in place. The cap 130 can be removed from the stanchion by prying it away therefrom with an external tool.

As in the first embodiment of the present invention the stanchion can include side rail mounting means 138, which is the same as heretofore described, as well as cross rail mounting means (not shown).

Figure 4:
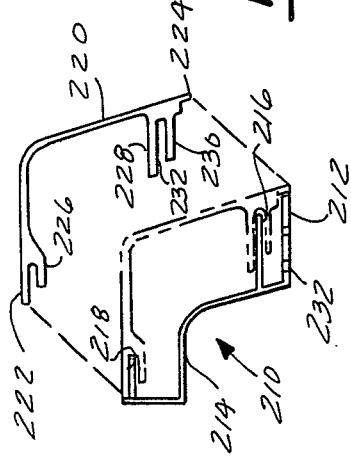
FIG. 4 is an exploded, sectional view, partly in phantom, of a further embodiment hereof.

Referring now FIG. 4 there is depicted therein a further embodiment of the present invention generally denoted at 210. In accordance herewith the stanchion hereof comprises a base 212, and upstanding end wall 214 integrally formed therewith and a pair of opposed, upstanding, substantially parallel side walls (not shown). The end wall 214, the side walls and the base cooperate to define an open walled, hollow interiored stanchion.

Radially extending and projecting from a first portion of the end wall 214, proximate the base 212 is a mounting plate 216. The plate 216 is disposed above the base 212 and is substantially parallel thereto. A second plate or flange 218 is formed on the end wall 214 and projects laterally inwardly therefrom. The plate 218 is parallel to the plate 216, as shown. In accordance with this embodiment the cap 220 has a first end 222 which mates with the uppermost end of the end wall 214. The cap also includes a second end 224 which mates with the base 212. A finger 226 is formed from the bottom surface of the cap 220 proximate the end 222. A pair of spaced apart, parallel legs 228, 230 project radially inwardly from the cap 220 and are formed proximate the end 224 thereof, as shown. The legs 228, 230 cooperate to define a space 232 therebetween.

As shown in phantom in FIG. 4 the plate 218 interdigitates with the cap 220 and the finger 226 proximate the end 222 thereof. Likewise, the plate 216 interdigitates with the cap 220 in the space 232 defined between the legs 228 and 230. The cap can, thus, be snap fitted into place by the interdigitating action effectuated between the spaces and the plates 218 and 216.

As shown in the drawing the base 212 is provided with at least one aperture 232 through which is inserted fasteners, such as threaded screws or the like, to securely mount the main section or support section to the surface of the vehicle. With the cap emplaced the fasteners are, thus, hidden from view and protected from the environment. Although not shown in the drawing the stanchion of this embodiment can incorporate side rail mounting means as well as cross rail mounting means.

Referring now to FIG. 5 there is depicted therein a still further embodiment of the present invention and generally denoted at 310. In accordance with this embodiment the stanchion 310 is defined by a main body or support member 312 and a cap 314. The main body member comprises a base 316, a side wall 318, an end wall 320 and a top wall 322. The walls and the base are integrally formed to define a unitary member. A gusset or the like may be employed to provide structural rigidity to the stanchion. The base has at least one aperture 324 formed therein through which are inserted fasteners or the like, (not shown) for fixing the stanchion to the surface of the vehicle. It is to be appreciated that the base, end wall and side wall cooperate to define a hollow interior structure. The cap or enclosure 314 is configured substantially similar to the side wall 318 and is press fitted or otherwise secured to the main body section 312 to define the closed structure. In accordance with this embodiment in lieu of the cap comprising the top wall, the enclosure or cap 314 defines a side wall for the stanchion. Again, as with the other embodiments of the present invention rail mounting means are contemplated for inclusion with the stanchion.

Referring now to FIG. 6 there is depicted therein a still further embodiment of the present invention. In accordance herewith, the stanchion 410 hereof is defined by a main body portion or support portion 412 and an enclosure 414. The main body portion 412 comprises a base section 416 and a pair of opposed, upstanding, parallel, spaced apart walls 418, 420 integrally formed with the base 416. Each wall 418, 420 has an inwardly directed flange 420, 422, respectively, formed at its upper or free end. The flanges define means for mounting the enclosure 414 to the main support body 412.

At least one aperture 424 is formed in the base 416. Threaded fasteners or the like, (not shown) are insertable through the apertures 424 to securely mount the main body section to the roof or other surface of the vehicle.

The cap or enclosure 414 envelops the main body section 412 and is provided with any desired configuration. As shown in the drawing the enclosure or cap 414 comprises a pair of spaced apart parallel side walls 426, 428, an end wall 430 and a top wall 432. Each side wall is provided with a radially, inwardly projecting finger 434, 436, respectively. The fingers 434 and 436 encircle and interdigitate with an associated flange 420 or 422, as shown. The enclosure 414 can, thus, be snap fitted onto the main body section 412 by snapping the fingers about the associated flange. Again, the enclosure can be provided with the rail mounting means as hereinabove described. Furthermore, it is to be perceived that with the enclosure properly in place the fasteners are hidden from view and, also, protective from inclement weather.

In practicing the present invention it should be noted that slidable cross rails can be mounted into the side rails or fixed cross rails can be mounted to the requisite stanchions, or any combination thereof can be employed. Hence, one stationary cross rail and one movable cross rail can be employed in the luggage rack hereof. Slidably positioned, positionably adjustable cross rails mounted onto side rails are known in the art. See, for example, U.S. Pat. No. 3,519,180.

Also, it should be noted that in practicing the present invention a mounting pad can be emplaced beneath the base of the stanchion. The pad 100 can be formed from any suitable material such as a plastic material or a natural rubber material. The pad prevents marring of the vehicle surface as well as galvonic welding of the stanchion to the roof of the vehicle. Similarly, and as above noted, the main body member can be formed from any suitable material such as metal, rigid plastic or the like. The only requisite attached thereto is that the part have sufficient structural rigidity for its intended purpose.

It is to be appreciated from the preceding that there has been described herein a stanchion which not only protects the fasteners from mounting the stanchion to the surface of the vehicle from the environment but which aesthetically improves the appearance of the stanchion by hiding the fasteners from ordinary view. Furthermore, it is to be appreciated that the stanchion can be removed from the surface of the vehicle by prying the enclosure away from the main body member and loosening the fasteners.

Having, thus, described the invention what is claimed is:

1. A stanchion for an article carrier of the type including a hollow main body section adapted to be secured to a vehicle surface, the improvement comprising:
   (a) the main body section including a base contained entirely within said main body section, the base having at least one aperture adapted to receive a fastener for mounting the stanchion to the vehicle surface, and
   (b) a cap member removably secured to the main body section to enclose said base and to permit access to said fastener.

2. A stanchion of the type set forth in claim 1 wherein said base is of rectangular cross section and said main body section includes walls extending upwardly from three sides of said rectangular base, said cap member extending upwardly from the fourth side of said base and cooperating with said walls to enclose said base.

3. A stanchion of the type set forth in claim 1 wherein said main body section includes a pair of inwardly projecting flanges spaced vertically above said base, said cap member including a pair of inwardly projecting elements cooperating with said flanges to secure said cap member to said main body section.

4. A stanchion for an article carrier of the type including a hollow main body section adapted to be secured to a vehicle surface, the improvement comprising:
   (a) the main body section including a base, a plurality of walls extending upwardly from said base and partially enclosing said base, the base having at least one aperture adapted to receive a fastener for mounting the stanchion to the vehicle surface, and
   (b) a cap member removably secured to the main body section and coacting with the upstanding walls to complete the enclosure of said base and to permit access to said fastener.

\* \* \* \* \*